United States Patent

Berneth et al.

[11] Patent Number: 4,695,633
[45] Date of Patent: Sep. 22, 1987

[54] CHROMOGENIC 4,4-DIARYL-DIHYDROQUINAZOLONES, THEIR PREPARATION AND THEIR USE

[75] Inventors: Horst Berneth, Leverkusen; Alfred Brack, Odenthal, both of Fed. Rep. of Germany

[73] Assignee: Bayer Aktiengesellschaft, Leverkusen, Fed. Rep. of Germany

[21] Appl. No.: 735,477

[22] Filed: May 17, 1985

[30] Foreign Application Priority Data

Jun. 4, 1984 [DE] Fed. Rep. of Germany ....... 3420799

[51] Int. Cl.⁴ .......................................... C07D 239/82
[52] U.S. Cl. ..................................... 544/286; 544/73; 544/74; 544/95; 544/101; 544/212; 544/245; 544/247; 544/250; 544/253; 544/284
[58] Field of Search ............ 544/286, 284, 212, 73–74, 544/95, 99, 101, 245, 247, 250, 253

Primary Examiner—Glennon H. Hollrah
Assistant Examiner—James H. Turnipseed
Attorney, Agent, or Firm—Sprung Horn Kramer & Woods

[57] ABSTRACT

Chromogenic 4,4-diaryl-dihydroquinazolones of the formula

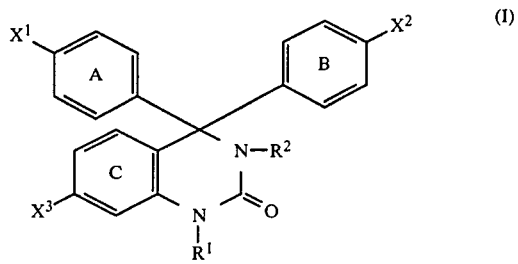

wherein $X^1$, $X^2$ and $X^3$ independently of one another represent hydrogen, halogen, alkyl, aryl, alkanoylamino, aroylamino, $NY^1Y^2$, $OY^3$ or $SY^3$, and wherein at least one of the radicals $X^1$, $X^2$ or $X^3$ represents $NY^1Y^2$, $OY^3$ or $SY^3$, $R^1$ denotes hydrogen, alkyl, cycloalkyl, aralkyl, aryl or the members of a bridge to the o-carbon of ring C, $R^2$ denotes hydrogen, alkyl, cycloalkyl, aralkyl, aryl, hetaralkyl or hetaryl, $Y^1$, $Y^2$ and $Y^3$ independently of one another denote hydrogen, alkyl, cycloalkyl, aralkyl or aryl or the remaining members of a 5-membered or 6-membered ring which reaches to one of the benzene-C atoms in the o-position and optionally contains further hetero-atoms, or $Y^1 + Y^2$ denote the remaining members of a 5-membered or 6-membered ring which optionally contains further hetero-atoms, and the rings A, B and C and the radicals mentioned can in turn carry non-ionic substituents customary in dyestuff chemistry, are used in pressure-sensitive and thermoreactive recording materials.

4 Claims, No Drawings

CHROMOGENIC 4,4-DIARYL-DIHYDROQUINAZOLONES, THEIR PREPARATION AND THEIR USE

The present invention relates to chromogenic 4,4-diaryl-dihydroquinazolones of the formula

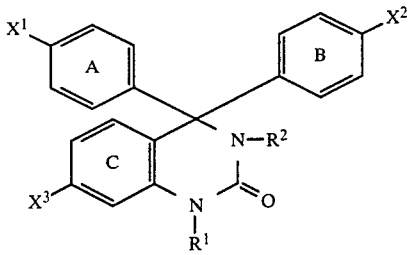

wherein
$X^1$, $X^2$ and $X^3$ independently of one another represent hydrogen, halogen, alkyl, aryl, alkanoylamino, aroylamino, $NY^1Y^2$, $OY^3$ or $SY^3$,
and wherein
at least one of the radicals $X^1$, $X^2$ or $X^3$ represents $NY^1Y^2$, $OY^3$ or $SY^3$,
$R^1$ denotes hydrogen, alkyl, cycloalkyl, aralkyl, aryl or the members of a bridge to the o-carbon of ring C,
$R^2$ denotes hydrogen, alkyl, cycloalkyl, aralkyl, aryl, hetaralkyl or hetaryl,
$Y^1$, $Y^2$ and $Y^3$ independently of one another denote hydrogen, alkyl, cycloalkyl, aralkyl or aryl or the remaining members of a 5-membered or 6-membered ring which reaches to one of the benzene-C atoms in the o-position and optionally contains further hetero-atoms, or
$Y^1 + Y^2$ denote the remaining members of a 5-membered or 6-membered ring which optionally contains further hetero-atoms, and
the rings A, B and C and the radicals mentioned can in turn carry non-ionic substituents customary in dyestuff chemistry, their preparation and their use in pressure-sensitive and thermoreactive recording materials.

Examples of non-ionic substituents customary in dyestuff chemistry are: halogen, hydroxyl, alkoxy, aryloxy, aralkoxy, hetaryloxy, aryl, hetaryl, alkylmercapto, arylmercapto, aralkylmercapto, alkylsulphonyl, cyano, carbamoyl, alkoxycarbonyl, amino, which can be substituted by 1 or 2 alkyl, aryl or aralkyl groups, or on which the substituents can be cyclised, alkenyloxy, alkylcarbonyloxy and arylcarbonyloxy and, as substituents on the rings, also alkyl, aralkyl, nitro, alkenyl or arylvinyl.

Alkyl preferably represents $C_1$-$C_{30}$-alkyl, in particular $C_1$-$C_{12}$-alkyl and especially $C_1$-$C_4$-alkyl, and alkenyl preferably represents $C_2$-$C_5$-alkenyl.

Halogen is to be understood as meaning, in particular, chlorine and bromine.

The alkyl radicals and the alkyl radicals in alkoxy, alkylthio, dialkylamino, alkanoylamino, alkylsulphonyl and alkoxycarbonyl groups can be branched and substituted, for example by fluorine, chlorine, $C_1$- to $C_4$-alkoxy, cyano or $C_1$-$C_4$-alkoxycarbonyl; particular examples are methyl, ethyl, propyl, 2-propyl, 2,2-dimethylpropyl, 2-butyl, 1-hexyl, 1-octyl, 1-dodecyl, 1-tetradecyl, 1-hexadecyl, 1-octadecyl, 2-bornyl-methyl, 2-chloroethyl, 2-cyanoethyl, 2-methoxy-ethyl, 2-ethoxycarbonylethyl and trifluoromethyl.

In particular, cycloalkyl is understood as meaning cyclohexyl, aryl is understood as meaning phenyl and naphthyl, aralkyl is understood as meaning benzyl and phenethyl, hetaryl is understood as meaning pyridyl, pyrimidyl, pyrazinyl, triazinyl, imidazolyl, oxazolyl, thiazolyl, triazolyl, thiadiazolyl or tetrazolyl, which can be benzo-fused, and hetaralkyl is understood as meaning the rings or ring systems mentioned, bonded to nitrogen via methylene or ethylene. The rings can be substituted by non-ionic substituents, in particular by $C_1$-$C_4$-alkyl, $C_1$-$C_4$-alkoxy, cyano, nitro or halogen.

The phenyl and naphthyl radicals and the radicals in benzyl or benzoylamino groups can carry up to 3 identical or different radicals.

Particular examples of substituted phenyl radicals are 2-, 3- or 4-tolyl, 2-, 3- or 4-anisyl, 2-, 3- or 4-chlorophenyl, 2-, 3- or 4-nitrophenyl, 2-, 3- or 4-cyanophenyl, 2-, 3- or 4-ethoxycarbonylphenyl, 2-, 3- or 4-methoxysulphonylphenyl, 2-, 3- or 4-trifluoromethylphenyl, 2,3-dinitrophenyl, 3,4-dimethylphenyl, 2-chloro-4-nitrophenyl, 3-chloro-4-nitrophenyl, 5-chloro-2-methyl-4-nitrophenyl, 4-chloro-3-methylphenyl, 3-chloro-4-methoxyphenyl, 3-chloro-4-trifluoromethylphenyl, 3,4-dicyanophenyl, 2,5-dichloro-4-cyanophenyl and 2-methyl-1-naphthyl.

The heterocyclic radicals can carry up to 3 identical or different radicals. Particular examples of substituted heterocyclic radicals are 2-methyl-4-pyridyl, 4-nitro-2-pyridyl, 4-phenyl-thiazol-2-yl, 5-methylbenzoxazolyl, 5-tert.-butyl-benzothiazolyl, dimethoxytriazyl and trichloropyrimidyl.

Preferred alkanoyl radicals are acetyl and propionyl, and the preferred aroyl radical is benzoyl.

Of the compounds of the formula (I), compounds which are to be mentioned in particular are those of the formula

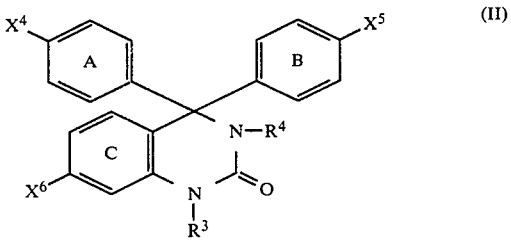

wherein
one of the radicals $X^4$, $X^5$ or $X^6$ represents $NY^4Y^5$ and the others independently of one another denote hydrogen, halogen, $C_1$- to $C_{12}$-alkyl, phenyl which is optionally substituted by chlorine and/or $C_1$- to $C_{12}$-alkyl, $C_1$- to $C_{12}$-alkanoylamino, benzoylamino which is optionally substituted by chlorine and/or $C_1$- to $C_{12}$-alkyl, $NY^4Y^5$, $OY^6$ or $SY^6$,
$R^3$ denotes hydrogen, $C_1$- to $C_{12}$-alkyl, cyclohexyl or benzyl or phenyl radicals, each of which is optionally substituted by chlorine and/or $C_1$-$C_4$-alkyl,
$R^4$ denotes hydrogen, $C_1$- to $C_{30}$-alkyl, which optionally carries chlorine, cyano, $C_1$- to $C_4$-alkoxycarbonyl and/or $C_1$- to $C_4$-alkoxy, cyclohexyl, which optionally carries chlorine and/or $C_1$- to $C_4$-alkyl, benzyl, which optionally carries nitro, chlorine, $C_1$- to $C_4$-alkyl and/or $C_1$- to $C_4$-alkoxy, or phenyl, naphthyl, picolyl, pyridyl, pyrimidyl, pyrazinyl, triazinyl, triazolyl, thiadiazolyl, tetrazolyl, optionally benzo-fused imidazole, oxazole or thiazole radicals, each of which optionally carries chlorine, bromine, nitro, $C_1$- to $C_4$-alkyl, $C_1$- to $C_4$-alkoxy, $C_1$- to $C_4$-alkylthio, mono- or di-$C_1$- to $C_4$-dialkylamino, $C_1$- to $C_4$-alkylsulphonyl, cyano and/or $C_1$- to $C_4$-alkoxycarbonyl, $Y^4$, $Y^5$ and $Y^6$ independently of one another denote $C_1$- to $C_8$-alkyl, which is optionally substituted by chlorine, cyano, $C_1$- to $C_4$-alkoxycarbonyl or $C_1$- to $C_4$-alkoxy, cyclohexyl or phenyl or benzyl, each of which can be substituted by chlorine, $C_1$- to $C_4$-alkyl or $C_1$- to $C_4$-alkoxy, or members which are necessary to complete one of the ring systems of the following formulae

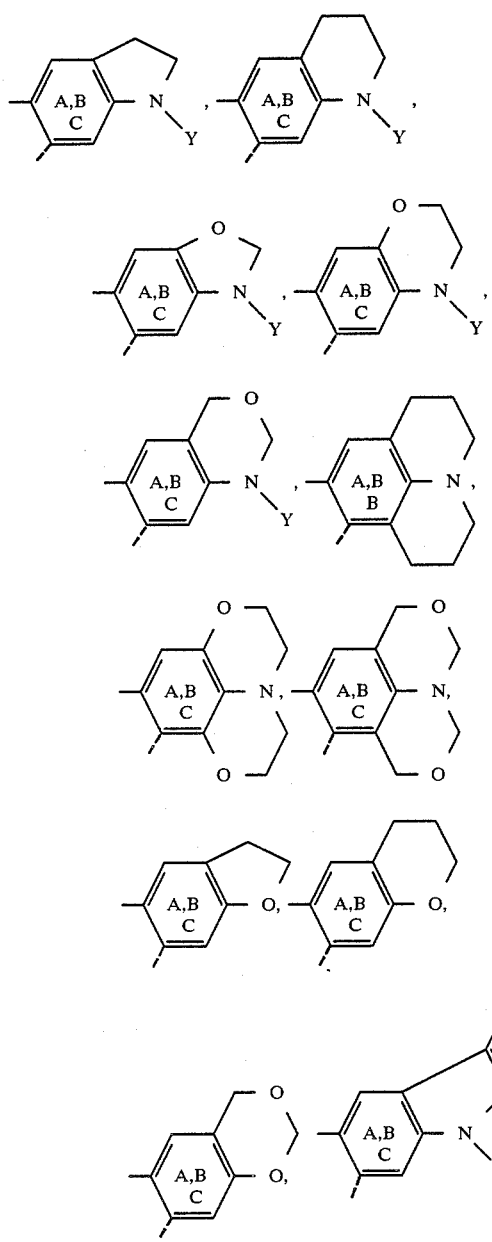

wherein
the broken line denotes further fusing in the case of ring C,

Y represents hydrogen, $C_1$- to $C_8$-alkyl which is optionally substituted by chlorine, cyano, $C_1$- to $C_4$-alkoxycarbonyl or $C_1$- to $C_4$-alkoxy, cyclohexyl or phenyl or benzyl, each of which can be substituted by chlorine, $C_1$- to $C_4$-alkyl or $C_1$- to $C_4$-alkoxy, the saturated ring part can carry up to 4 radicals from the group comprising chlorine, $C_1$- to $C_4$-alkyl, $C_1$- to $C_4$-alkoxy and phenyl and the rings A, B and C can be substituted by chlorine, $C_1$- to $C_4$-alkyl, $C_1$- to $C_4$-alkoxy and/or $C_1$- to $C_4$-alkanoylamino, or $NY^4Y^5$ denotes a pyrrolo, pyrrolidino, piperidino, pipecolino, morpholino, pyrazolo or pyrazolino radical, each of which is optionally substituted by chlorine, $C_1$- to $C_4$-alkyl or aryl, in particular phenyl.

Examples of radicals substituted in the saturated ring are:

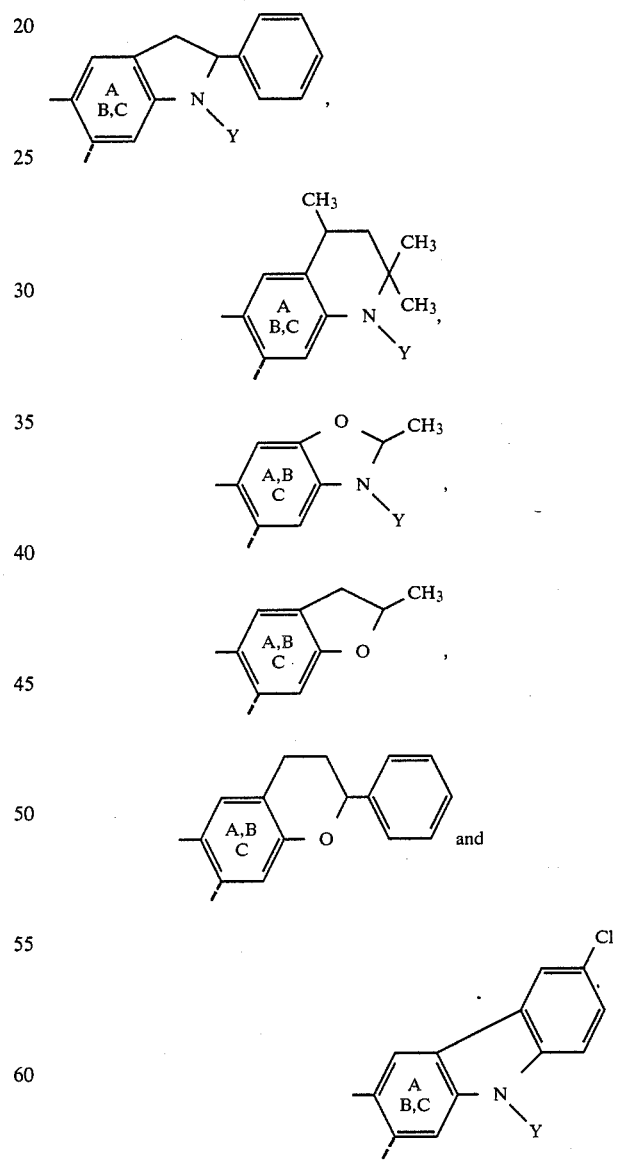

In preferred compounds of the formula (II), two of the radicals $X^4$, $X^5$ or $X^6$ represent $NY^4Y^5$ and $X^4$, $X^5$ and $X^6$ represent $X^{4'}$, $X^{5'}$ and, respectively, $X^{6'}$=hydrogen, chlorine, bromine, $C_1$- to $C_4$-alkyl, phenyl, which is optionally substituted by chlorine and/or $C_1$- to $C_4$-alkyl, $C_1$- to $C_4$-alkanoylamino, benzoylamino, which is optionally substituted by chlorine and/or $C_1$- to $C_4$-alkyl, $OY^{6'}$ or $SY^{6'}$, $R^3$ represents $R^{3'}$=hydrogen or $C_1$–$C_4$-alkyl, $R^4$ represents $R^{4'}$=hydrogen, $C_1$- to $C_{12}$-alkyl, which optionally carries chlorine or $C_1$- to $C_4$-alkoxy, cyclohexyl, benzyl, which optionally carries chlorine and/or $C_1$- to $C_4$-alkyl, or phenyl, naphthyl, picolyl, pyridyl, pyrimidyl, pyrazinyl, triazinyl, triazolyl, thiadiazolyl, tetrazolyl, optionally benzofused imidazole, oxazole or thiazole radicals, each of which optionally carries chlorine, bromine, nitro, $C_1$- to $C_4$-alkyl, $C_1$- to $C_4$-alkoxy, $C_1$- to $C_4$-alkylthio, $C_1$- to $C_4$-dialkylamino, $C_1$- to $C_4$-alkylsulphonyl, cyano and/or $C_1$- to $C_4$-alkoxycarbonyl, $Y^4$, $Y^5$ and $Y^6$ represent $Y^{4'}$, $Y^{5'}$ and, respectively, $Y^{6'}$=, independently of one another, hydrogen, $C_1$–$C_4$-alkyl, which is substituted by chlorine, cyano, methoxycarbonyl, methoxy or ethoxy, cyclohexyl or benzyl or phenyl, each of which can be substituted by chlorine, methyl or methoxy, or $Y^{4'}$, $Y^{5'}$ and $Y^{6'}$ represent members which are necessary to give the ring systems listed under $Y^4$, $Y^5$ and $Y^6$.

4,4-Diaryl-dihydroquinazolones which are to be particularly mentioned are those of the formula

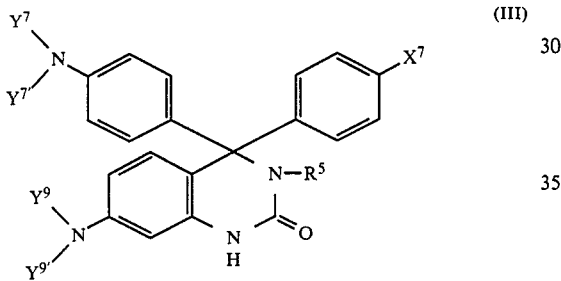

wherein
$R^5$ denotes methyl, ethyl, 1-propyl, 2-propyl, 2-methyl-1-propyl, 1-butyl, 2-butyl, 2,2-dimethyl-1-propyl, 1-pentyl, 2-pentyl, 1-hexyl, 1-dodecyl, 1-tetradecyl, 1-hexadecyl, 1-octadecyl, 2-bornylmethyl, cyclohexyl, benzyl, phenyl, 2-, 3- or 4-tolyl, 2-, 3- or 4-anisyl, 2-, 3- or 4-chlorophenyl, 2-, 3- or 4-nitro-phenyl, 2-, 3- or 4-cyano-phenyl, 2-, 3- or 4-trifluoromethyl-phenyl, 3- or 4-methoxycarbonyl-phenyl, 3- or 4-methoxysulphonyl-phenyl, 2,4-dinitro-phenyl, 3-chloro-4-trifluoromethyl-phenyl, 2-chloro-4-nitrophenyl, 3-chloro-4-nitro-phenyl, 5-chloro-2-methyl-4-nitro-phenyl, 4-chloro-3-methyl-phenyl, 3,4-dicyano-phenyl, 2,5-dichloro-4-cyanophenyl, 4-pyridyl, benzothiazolyl, 5-methyl-benzoxazolyl or 4,5,6-trichloro-2-pyrimidyl, $X^7$ denotes $NY^8Y^{8'}$ or hydrogen, methoxy, ethoxy, propoxy, benzyloxy, methylthio or ethylthio, $Y^7$ to $Y^9$ denote methyl, ethyl, cyanoethyl, methoxyethyl, methoxycarbonylethyl, benzyl or phenyl and $Y^{7'}$ to $Y^{9'}$ denote hydrogen, methyl, ethyl, cyanoethyl, methoxyethyl, methoxycarbonylethyl, benzyl or phenyl.

Important examples of compounds of the formula (III) are those in which $R^5$ denotes 2-propyl, 2-butyl, cyclohexyl, phenyl, 2- or 4-nitro-phenyl, 2-chloro-4-nitro-phenyl, 4-ethoxycarbonyl, 4-methoxysulphonyl-phenyl, 3,4-dicyano-phenyl, 2,5-dichloro-4-cyano-phenyl, 3-chloro-4-trifluoromethyl-phenyl, 4-pyridyl or benzothiazolyl.

4,4-Diaryl-dihydroquinazolones which are also to be especially mentioned are those of the formula

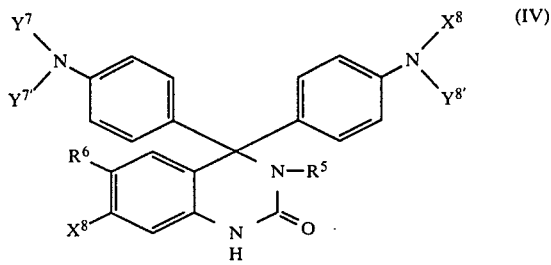

wherein
$R^6$ denotes hydrogen, chlorine, methyl or methoxy,
$X^8$ denotes hydrogen, chlorine, methyl, ethyl, propyl, butyl, benzyl, methoxy, ethoxy, propoxy, benzyloxy, methylthio, ethylthio, acetylamino, benzoylamino or $NHCONHR^5$, and wherein
$R^6$ and $X^8$ do not simultaneously represent hydrogen, and
$R^5$, $Y^7$ and $Y^8$ have the meaning given in the case of formula (III). The invention also relates to a process for the preparation of a 4,4-diaryl-dihydroquinazolone of the formula (I), characterised in that a urea compound of the formula

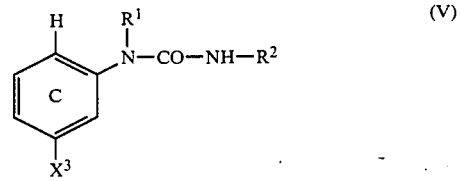

is reacted with a ketone of the formula

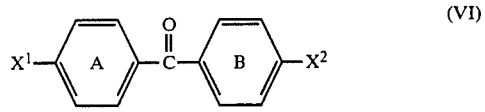

wherein
$X^1$, $X^2$, $X^3$, $R^1$, $R^2$, A, B and C have the abovementioned meaning.

The compounds (V) are, in particular, those in which $X^3$ is an electron donor substituent, such as $NY^1Y^2$, $OY^3$ or $SY^3$, wherein
$Y^1$ to $Y^3$ have the abovementioned meaning and the ring C is not deactivated by powerful electron acceptor substituents, such as, for example, nitro, cyano or alkoxycarbonyl.

The reaction is usually carried out with reagents which split off water, with or without solvents which are inert under these conditions at temperatures between 0° C. and the boiling point of the particular medium. After removal of the inert solvents, if necessary, the mixture is then discharged onto, for example, water or an alcohol. The 4,4-diaryl-dihydroquinazolones of the formula I are obtained by increasing the pH value with, for example, alkali metal or alkaline earth metal hydroxides, carbonates, bicarbonates, ammonia or amines until the colour of this mixture disappears. It may be necessary here, in order to split off the water from any carbinol bases which may have formed, to warm the mixture for some time or to treat the impure product primarily obtained in solvents, such as alcohols—for example methanol, ethanol, 2-propanol or butanol, nitriles—for example acetonitrile, ketones—for example acetone or 2-butanone, or esters—for example ethyl acetate or butyl acetate, for some time at temperatures between room temperature and the boiling point of the particular medium.

Examples of reagents which split off water are phosphorus oxychloride, phosphorus pentachloride, diphosphorus pentoxide, phosgene, phosphorus trichloride, phosphorus tribromide, sulphuryl chloride, thionyl chloride, oxalyl chloride or mixtures thereof. Phosphorus oxychloride and phosphorus oxychloride/diphosphorus pentoxide are preferably employed.

Examples of suitable inert solvents are toluene, chlorobenzene, dichlorobenzene, nitrobenzene and chlorinated aliphatic hydrocarbons, such as 1,2-dichloroethane.

The 4,4-diaryl-dihydroquinazolones of the formula (I) can also be prepared by oxidation of leuco compounds of the formula

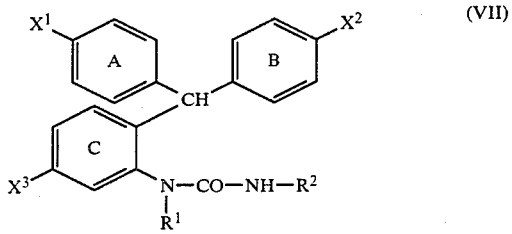

wherein
$X^1$, $X^2$, $X^3$, $R^1$, $R^2$, A, B and C have the abovementioned meaning.

This oxidation can be carried out in a known manner with metal compounds of a relatively high valency, such as $PbO_2$, permanganates, $CrO_3$, chromates, dichromates, $NiO_2$ or $K_3[Fe(CN)_6]$, with quinones, such as chloranil, tetrachloro-o-quinone or dichlorodicyanoquinone, or in another manner which is known from the literature, such as, for example, with oxygen, air, perborates or hydrogen peroxide.

The working up, isolation and any after-treatment are carried out in a manner analogous to those described above.

The oxidation with metal compounds of the relatively high valency is usually carried out in an acid medium or in organic solvents, such as alcohols-for example ethanol, isopropanol or ethylene glycol monomethyl ether, ketones-for example acetone, butanone or methyl isopropyl ketone, or polar aprotic solvents, for example N-methyl-pyrrolidone, γ-butyrolactone, acetonitrile, dimethylsulphoxide or sulpholane, or in mixtures of such solvents with acids, at temperatures between 0° C. and 60° C., preferably at 10°-40° C.

Examples of suitable acids are hydrochloric acid, sulphuric acid, phosphoric acid, acetic acid, propionic acid or mixtures with one another and/or mixtures with water. A preferred mixture is hydrochloric acid, acetic acid and water.

The oxidation with quinones is usually carried out in organic solvents, such as alcohols—for example methanol, ethanol or isopropanol; ketones—for example acetone or butanone; esters—for example ethyl acetate or butyl acetate; carboxylic acids—for example acetic acid or propionic acid; or polar aprotic solvents, such as N-methylpyrrolidone, dimethylformamide, γ-butyrolactone, acetonitrile or sulpholane, or in mixtures thereof, at temperatures between 0° C. and the boiling point of the medium, preferably at 20°-70° C.

The 4,4-diaryl-dihydroquinazolones of the formula (I) are usually colourless or at most slightly coloured.

When these colour-forming agents are brought into contact with a developer, which is preferably acid, that is to say with an electron acceptor, intensive blue, green-blue or green colour shades which are excellently fast to sublimation and light result.

They are also useful when mixed with one or more other known colour-forming agents, for example 3,3-bis-(aminophenyl)-phthalides, 3,3-bis-(indolyl)-phthalides, 3-amino-fluoranes, 3,6-diamino-fluoranes, leucoauramines, spiropyrans, spirodipyrans, chromenoindoles, phenoxazines, phenothiazines, carbazolylmethanes or other triarylmethane leuco dyestuffs, to give blue, navy blue, grey or black dyeings.

The 4,4-diaryl-dihydroquinazolones of the formula (I) exhibit a good colour intensity and fastness to light both in phenolic substrates, and, in particular, on activated clays. They are suitable, above all, as colour-forming agents for use in a heat-sensitive or pressure-sensitive recording material, which can be either a copying or registering material. Their rate of development differs, depending on the substituents. A slow rate of development leads to a reduced sensitivity of the recording materials towards unintentional premature development.

Some of the 4,4-diaryl-dihydroquinazolones of the formula I, chiefly those in which $R^2$ denotes an optionally substituted alkyl radical, are colour-forming agents with develop decidedly slowly. Because of their good fastness to light, they are suitable as mixing components for colour-forming agents which develop rapidly but which have little fastness to light, for example crystal violet lactone. The fastness to light of the recording is thus improved.

A pressure-sensitive material consists, for example, of at least one pair of sheets which contain at least one colour-forming agent of the formula I dissolved or dispersed in a non-volatile organic solvent, and an electron acceptor as the developer.

Typical examples of such developers are inorganic substances, such as clays, metal salts or oxides or organic polymers, such as phenolic resins.

The developers can additionally also be used as a mixture with other pigments which are unreactive per se or have little reactivity.

At the points where it comes into contact with the electron acceptor, the colour-forming agent produces a coloured marking. In order to prevent premature activation of the colour-forming agents present in the pressure-sensitive recording material, these are as a rule separated from the electron acceptor. This can advantageously be achieved by incorporating the colour-forming agents in foam-like, sponge-like or honeycomb-like structures. The colour-forming agents are preferably enclosed in microcapsules, which as a rule can be crushed under pressure. Processes for the preparation of such microcapsules are known.

Examples of suitable non-volatile solvents are partially hydrogenated terphenyl, alkylated napthalenes or dibutyl phthalate.

An arrangement in which the encapsulated colour-forming agent is present in the form of a layer on the reverse side of a transfer sheet and the electron acceptor is present in the form of a layer on the front side of a receiver sheet is preferred.

Another arrangement of the constituents is that in which the microcapsules containing the colour-forming agent, and the developer are present in or on the same sheet in the form of one or more individual layers or in the paper pulp.

The compounds of the formula I can preferably also be used as colour-forming agents in a thermoreactive recording material. This as a rule contains at least one carrier for the layer, a colour-forming agent, an electron acceptor and, if appropriate, also a binder.

Thermoreactive recording systems include, for example, heat-sensitive recording and copying materials and papers. These systems are used, for example, for recording information, for example in electronic calculators, teleprinters, telex machines or recording equipment and measuring instruments, such as, for example, electrocardiographs. The production of the image (marking) can also be effected manually with a heated pen. Another arrangement for producing markings by means of heat are laser beams.

The thermoreactive recording material can be built up such that the colour-forming agent is dissolved or dispersed in a binder layer and the developer is dissolved or dispersed in the binder in a second layer. Another possibility is that in which both the colour-forming agent and the developer are dispersed in one layer. The binder is softened in specific ranges by means of heat and, at these sites where heat is applied, the colour-forming agent comes into contact with the electron acceptor and the desired colour develops immediately.

Suitable developers are the same electron acceptors as those used in pressure-sensitive papers, preferably phenolic compounds, such as are described, for example, in German Patent Specification No. 1,251,348, as well as boric acid and organic, preferably aliphatic dicarboxylic acids.

Fusible, film-forming binders are preferably used to prepare the thermoreactive recording material. These binders are usually water-soluble, whilst the 4,4-diaryl-dihydroquinazolones and the developer are sparingly soluble or insoluble in water. The binder should be capable of dispersing and fixing the colour-forming agent and the developer at room temperature.

Under the action of heat, the binder softens or melts, so that the colour-forming agent comes into contact with the developer and a colour can form. Examples of water-soluble or at least water-swellable binders are hydrophilic polymers, such as polyvinyl alcohol, polyacrylic acid, hydroxyethylcellulose, methylcellulose, carboxymethylcellulose, polyacrylamide, polyvinylpyrrolidone, gelatine and starch.

The thermoreactive layers can contain further additives: to improve the degree of whiteness, to facilitate printing of the papers, to prevent the heated pen from sticking and to form the colour only within a limited temperature range.

The processes and formulations described are known, for example, from U.S. Pat. Nos. 2,948,753, 3,096,189 and 3,193,404 and from German Offenlegungsschriften Nos. 2,555,080 and 2,700,937.

EXAMPLE 1

27.0 g of Michler's hydrol and 23.5 g of N-(3-dimethylaminophenyl)-N'-(2-butyl)-urea are warmed to 40°–50° C. in 200 ml of 50% strength acetic acid and 3 g of concentrated hydrochloric acid under nitrogen for 1 hour. The mixture is then introduced into 2 l of water and a pH of 5 is established. The precipitate is filtered off with suction, washed with water and dried: 48.7 g (100% of theory) of a compound of the formula

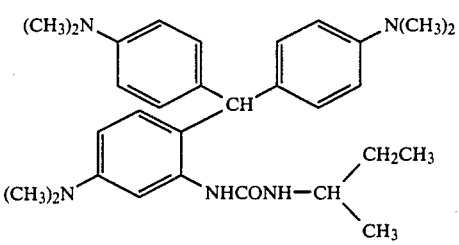

Recrystallisation from ethanol gives small needles of melting point 186°–187° C.

24 ml of a 20% strength aqueous lead dioxide suspension are added to 9.74 g of this leuco compound in 40 ml of 50% strength acetic acid and 6 g of concentrated hydrochloric acid at 10° C. The temperature rises to 30° C. After 5–10 minutes, 14 ml of 20% strength sulphuric acid are added, the lead sulphate is filtered off and the deep blue filtrate, after dilution with 100 ml of methanol, is poured into a solution of 80 g of sodium hydroxide in 600 ml of ice-water. The pale blue precipitate is filtered off with suction, washed with water and dried. When boiled in 40 ml of ethanol, it is converted into colourless crystals which, after cooling, are filtered off with suction, washed with ethanol and dried. -

4.9 g (51% of theory) of a compound of melting point 311°–312° C. (decomposition) and of the formula

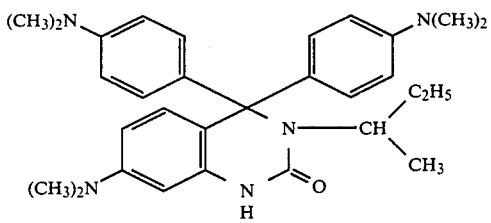

A solution in glacial acetic acid becomes blue with $\lambda_{max}=600$ nm. A blue colour develops with bisphenol A in thermoprinting.

$^1$H-NMR (CDCl$_3$): $\delta=0.58$ (t; 3H, $\underline{CH_3}CH_2$), 1.28 (d; $\underline{CH_3}CH$), 1.42 (mc; 2H, $CH_3\underline{CH_2}CH$), 2.08 (mc; 1H, $\underline{CH}-CH_2$), 2.87 (s; 6H, N($\underline{CH_3}$)$_2$), 2.94 (2s; 12H, 2xN(CH$_3$)$_2$), ABC signal ($\delta_A=6.53$, $\delta_B=6.14$, $\delta_C=5.98$; 3H,

),

AA'BB' signal ($\delta_A=7.24$, $\delta_B=6.66$; 4H,

AA'BB' signal ($\delta_A=7.29$, $\delta_B=6.66$; 4H, 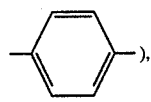

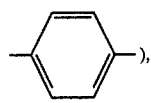

7.83 (s; 1H, NH).

The N-(3-dimethylaminophenyl)-N'-(2-butyl)-urea used as the starting material is prepared as follows:

40.9 g of 3-dimethylamino-aniline and 29.7 g of 2-butyl isocyanate are brought together in 150 ml of toluene. The mixture warms to 60° C. After cooling, the precipitate is filtered off with suction, washed with toluene and dried. 59.3 g (84% of theory) of colourless crystals of melting point 145°–146° C. and of the formula

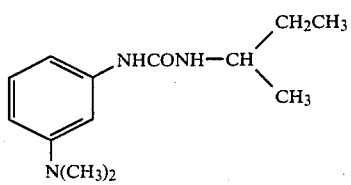

are obtained.

The following 4,4-diaryldihydroquinazolones are prepared analogously to Example 1:

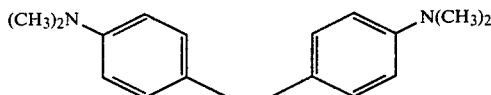

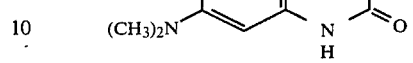

| Example | R² | Melting point °C. | λ_max nm | Colour on clay or with bisphenol A |
|---|---|---|---|---|
| 2 | —CH(CH₃)₂ | 315–316 (decomposition) | 600 | blue |
| 3 | —CH₂—(phenyl) | 274–277 | 605 | blue |
| 4 | —C₁₂H₂₅ | 180–183 | 604 | blue |
| 5 | —(phenyl) | 283–284 | 604 | blue |
| 6 | —(2-methylphenyl) | 275–276 (decomposition) | 600 | blue |
| 7 | —(2-nitrophenyl) | 274–275 (decomposition) | 606 | blue |
| 8 | —CH₂CH(CH₃)₂ | 275–278 (decomposition) | 594 | blue |
| 9 | —(cyclohexyl) | 308–311 (decomposition) | 604 | blue |
| 10 | —(3-chloro-4-trifluoromethylphenyl) | 251–253 (decomposition) | 605 | blue |
| 11 | —(4-ethoxycarbonylphenyl) | 266–268 (decomposition) | 606 | blue |
| 12 | —(2-methylbenzothiazolyl) | 249–252 (decomposition) | 605 | blue |

EXAMPLE 13

27.0 g of Michler's hydrol and 30.0 g of N-(3-dimethylaminophenyl)-N'-(4-nitrophenyl)-urea are refluxed in 200 ml of ethanol and 3 ml of glacial acetic acid under nitrogen for 2 hours. After cooling, 35.9 g (65% of theory) of a yellow crystalline powder of melting point 198°–201° C. (decomposition) and of the formula

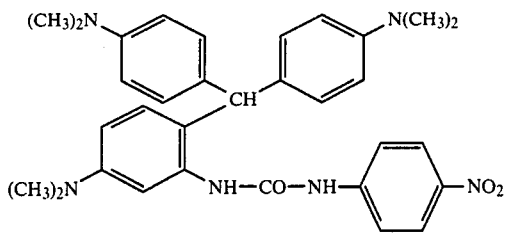

crystallise out.

11.05 g of this leuco compound are stirred in 50 ml of dimethylformamide with 4.9 g of chloranil at 50° C. for ½ hour. The mixture is discharged onto 500 ml of water, the pH is brought to 10 with sodium hydroxide solution and the product is filtered off with suction and washed with water. While still moist, it is suspended in 400 ml of water, the pH is brought to 12 with sodium hydroxide solution, the mixture is heated to 80° C. and the product is filtered off with suction and washed with water. The filter-cake is dried and finally recrystallised from toluene. 7.8 g (70% of theory) of small yellowish crystals of melting point 234°–235° C. and of the formula

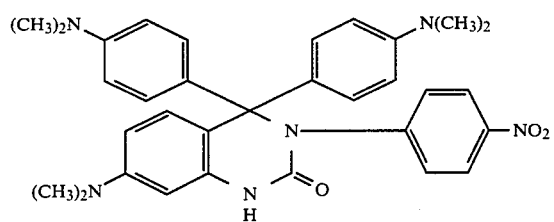

are obtained.

A solution in glacial acetic acid becomes blue with $\lambda_{max}=604$ nm. A blue colour is also developed on acid clay.

$^1$H-NMR (CDCl$_3$): $\delta=2.88$ (s; 18N, 3xN(CH$_3$)$_2$), ABC signal ($\delta_A=6.68$, $\delta_b=6.27$, $\delta_C=6.80$; 3H), AA'BB' signal ($\delta_A=7.10$, $\delta_B=6.53$; 8H, 2 x

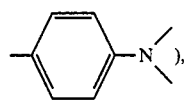

AA'BB' signal ($\delta_A=7.83$, $\delta_B=7.13$; 4H,

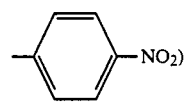

and 7.73 (s; 1H, NH).

The urea derivative used as the starting material is prepared as described in Example 1 from 40.9 g of 3-dimethylamino-aniline and 49.2 g of 4-nitrophenyl isocyanate. 63.8 g (71% of theory) of yellow crystals of melting point 202°–205° C. (decomposition) are obtained.

The following 4,4-diaryldihydroquinazolones are prepared analogously to Example 13:

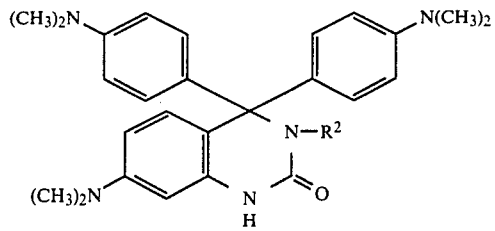

| Example | R$^2$ | $\lambda_{max}$ (nm) | Colour on clay or with bisphenol A |
|---|---|---|---|
| 14 | ![3-Cl-4-NO2-phenyl] | 606 | blue |
| 15 | ![4-Cl-phenyl] | 602 | blue |
| 16 | ![4-SO2OCH3-phenyl] | 605 | blue |
| 17 | ![4-SO2C4H9-phenyl] | 606 | blue |
| 18 | ![3,4-diCN-phenyl] | 606 | — |
| 19 | ![2,5-diCl-4-CN-phenyl] | 606 | blue |
| 20 | ![2-CH3-4-NO2-5-Cl-phenyl] | 604 | blue |
| 21 | ![2-OCH3-phenyl] | 600 | blue |
| 22 | ![pyridyl] | 606 | blue |

-continued

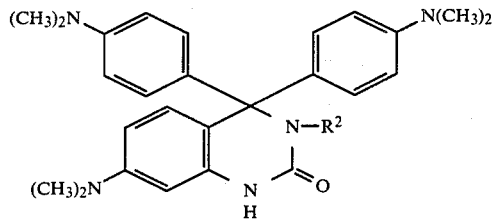

| Example | R² | λ_max (nm) | Colour on clay or with bisphenol A |
|---|---|---|---|
| 23 | ![oxazole with CH3] | 606 | blue |
| 24 | ![naphthyl] | 598 | blue |

EXAMPLE 25

10.3 g of 4-dimethylaminophenyl-4-methoxyphenyl-methanol and 8.84 g of N-(3-dimethylaminophenyl)-N'-(2-propyl)-urea are stirred in 80 ml of 50% strength acetic acid and 1.2 g of concentrated hydrochloric acid under nitrogen at 40°–50° C. for 1 hour. The mixture is then introduced into 50 ml of water and a pH of 5 is established. The precipitate is filtered off with suction, washed with water and dried: 16.4 g (89% of theory) of a compound of the formula

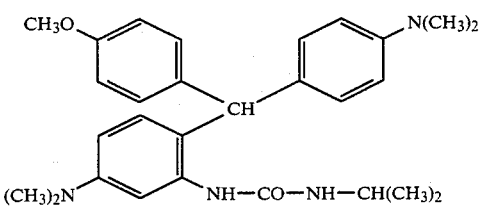

with a melting point of 92°–94° C.

¹H-NMR (CDCl₃): δ=1.04 (d; 6H, CH(CH₃)₂), 2.91 (2s; 12H, N(CH₃)₂), 3.78 (s; 3H, OCH₃), 3.85 (mc; 1H, CH(CH₃)₂), 4.33 (d; 1H, NHCH), 5.43 (s; 1H, leuco-H), 5.69 (s; 1H, Ar—NH), ABC signal (δ_A=6.81, δ_B=6.77, δ_C=6.5; 3H;

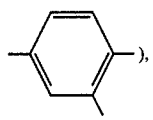

AA′BB′ signal (δ_A=6.92, δ_B=6.65; 4H,

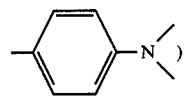

and AA′BB′ signal (δ_A=6.98, δ_B=6.80; 4H,

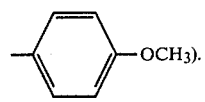

15.5 ml of a 31% strength aqueous lead dioxide suspension are added to 9.2 g of this leuco compound in 40 ml of 80% strength acetic acid and 6 g of concentrated hydrochloric acid at 5° C. The temperature increases to 30° C. After 5–10 minutes, 14 ml of 20% strength sulphuric acid are added, the lead sulphate is filtered off and the deep green filtrate, after dilution with 100 ml of methanol, is poured into a solution of 80 g of sodium hydroxide in 60 ml of ice-water. The pale green precipitate is filtered off with suction, washed with water and dried. On boiling with 25 ml of 2-propanol, it is converted into colourless crystals, which, after cooling, are filtered off with suction, washed with 2-propanol and dried: 4.1 g (59% of theory) of a compound of melting point 297°–300° C. (decomposition) and the formula

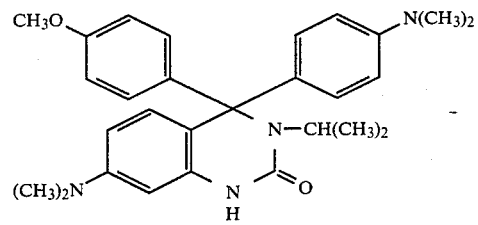

A solution in glacial acetic acid becomes green with λ_max=474, 621 nm. A green colour is likewise developed with bisphenol A in thermoprinting.

¹H-NMR (CDCl₃): δ=1.25 (t; 2d, 6H, CH(CH₃)₂), 2.85, 2.95 (each s; 6H, N(CH₃)₂), 3.35 (septet; 1H, CH(CH₃)₂), 3.79 (s; 3H, CH₃O), ABC signal (δ_A=6.45, δ_B=6.13, δ_C=6.03; 3H,

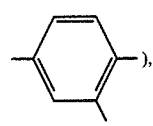

AA′BB′ signal (δ_A=7.25, δ_B=6.66; 4H,

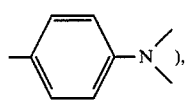

AA′BB′ signal (δ_A=7.36, δ_B=6.83; 4H,

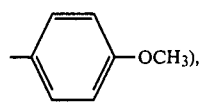

8.20 (s; 1H, NH).

The following 4,4-diaryldihydroquinazolones are prepared analogously to Example 25:

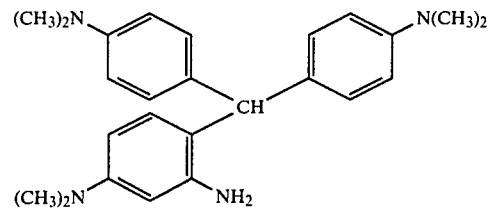

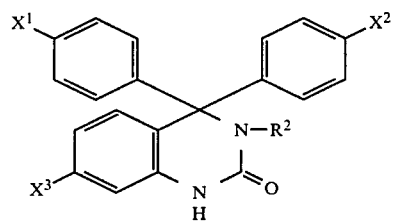

| Example | X¹ | X² | X³ | R² | Colour shade with bisphenol A |
|---|---|---|---|---|---|
| 26 | —OCH₃ | —N(C₆H₅)(CH₃) | —N(CH₃)₂ | —C₆H₄—NO₂ | blue-green |
| 27 | H | —N(CH₃)₂ | " | —CH(C₆H₅)(CH₃) | green |
| 28 | —OCH₃ | —SCH₃ | " | —C₆H₄—NO₂ | blue-green |
| 29 | —NHC₆H₅ | —N(CH₃)₂ | —OC₂H₅ | " | greenish-tinged blue |
| 30 | " | " | " | trichloropyrimidinyl | greenish-tinged blue |
| 31 | —N(pyrrolidinyl) | —N(pyrrolidinyl) | —N(CH₃)₂ | —C₆H₃(CN)₂ | blue |
| 32 | —N(morpholinyl) | —N(morpholinyl) | —N(CH₃)₂ | —C₆H₄—COOCH₃ | blue |

EXAMPLE 33

38.8 g of the leuco compound prepared according to German Patent Specification No. 82,268, of the formula are stirred with 13.2 g of phenyl isocyanate in 300 ml of toluene at 60° C. for 1 hour. The solvent is distilled off and the residue is recrystallised from ethanol. 36.5 g (72% of theory) of a colourless crystalline powder of melting point 183°–184° C. and of the formula

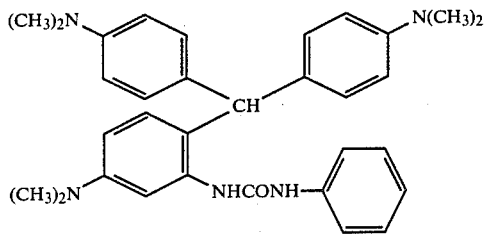

is obtained.

This compound can be oxidised analogously to Example 1 or 13 to give the compound of Example 5.

The compounds of Examples 1 to 4, 6 to 28, 31 and 32 can be prepared analogously.

EXAMPLE 34

35.9 g of the compound prepared by the method of A. Baeyer and V. Villiger, Ber. Dtschen Chem. Ges. 36, 2,774 (1903), of the formula

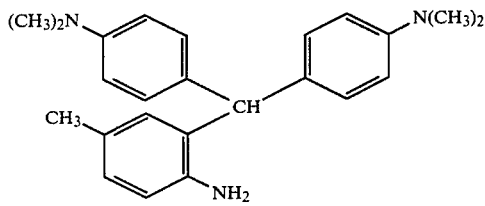

are stirred in 300 ml of toluene with 8.5 g of 2-propyl isocyanate at 60° C. for 1 hour. After cooling, the product is filtered off with suction, washed with 100 ml of petroleum ether 40/80 and dried. 27 g (61% of theory) of a beige powder of melting point 119°–120° C. and of the formula

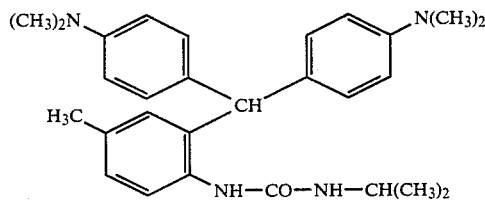

are obtained.

This compound can be oxidised analogously to Example 1 or 13. The crude product is boiled in 100 ml of ethanol until decolorisation occurs. After cooling, 17.1 g (63% of theory in the oxidation) of a colourless powder with a melting point >300° C. and of the formula

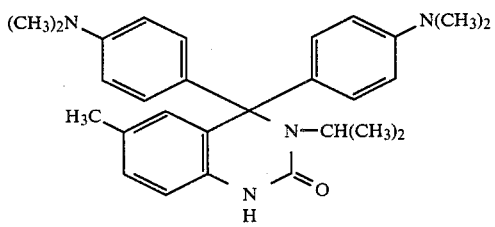

are obtained.

A solution in glacial acetic acid becomes green with $\lambda_{max}=625$ nm. A dull blue-green colour is likewise developed with bisphenol A by thermoprinting.

EXAMPLE 35

18.8 g of the compound of the formula

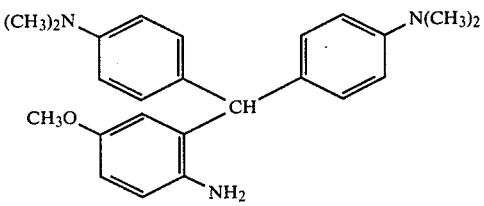

are stirred in 150 ml of toluene with 8.2 of 4-nitrophenyl isocyanate at 60° C. for 2 hours. After cooling, the product is filtered off with suction, washed with toluene and methanol and dried. 23.2 g (86% of theory) of small yellowish crystals of melting point 167°–169° C. (decomposition) and of the formula

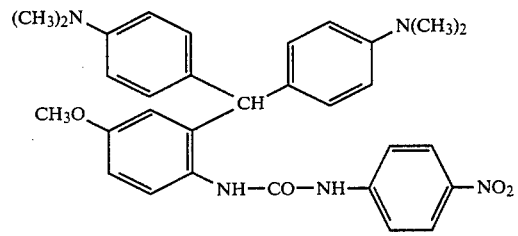

are obtained.

This compound can be oxidised analogously to Example 1 or 13. Boiling in 60 ml of ethanol gives 18.3 g (79% of theory) of an orange-yellow crystalline powder of the formula

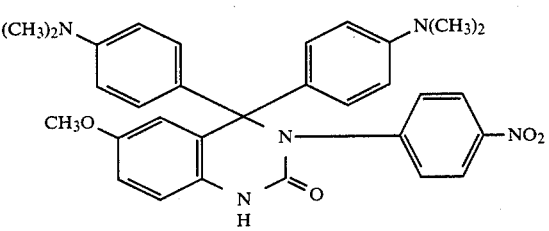

Melting point 267°–269° C. (decomposition) from dimethylformamide.

$^1$H-NMR ([D$_6$]-DMSO): $\delta=2.83$ (s; 12H, 2N(CH$_3$)$_2$), 3.57 (s; 3H, OCH$_3$), ABC signal ($\delta_A=6.80$, $\delta_B=6.76$, $\delta_C=6.18$; 3H,

),

AA'BB' signal ($\delta_A=7.01$, $\delta_B=6.58$; 8H, 2 ×

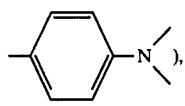

AA'BB' signal ($\delta_A=7.86$, $\delta_B=7.12$; 4H,

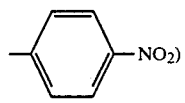

and 9.83 (s; 1H, NH).

A solution in glacial acetic acid becomes green with $\lambda_{max}=632$ nm. A blue-green colour is likewise developed with bisphenol A by thermoprinting.

The following 4,4-diaryldihydroquinazolones can be prepared analogously:

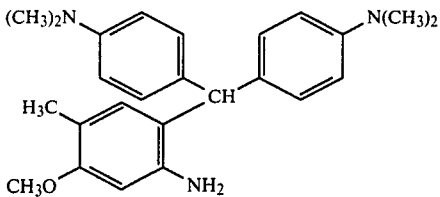

are obtained 38.9 g are stirred in 300 ml of toluene with 16.4 g of 4-nitrophenyl isocyanate at 60°–65° C. for 2 hours. After cooling, the product is filtered off with suction, washed with toluene and dried. 36 g (65% of theory) of yellow crystals of melting point 178°–180° C. (decomposition) and of the formula

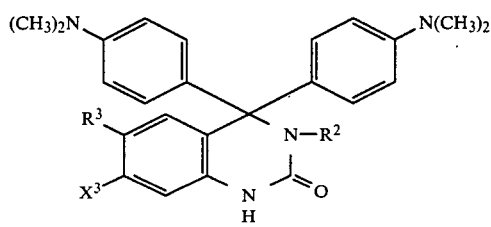

| Example | R¹ | R² | R³ | X³ | Colour with bisphenol A |
|---------|----|----|-----|----|------------------------|
| 36 | H | ![](NO2, Cl-phenyl) | C₂H₅O | H | green |
| 37 | phenyl | 4-CN-phenyl | " | " | " |
| 38 | H | 4-COOCH₃-phenyl | CH₃O | Cl | " |
| 39 | " | benzothiazol-2-yl | benzyloxy | " | " |

EXAMPLE 40

270 g of Michler's hydrol and 137 g of 3-methoxy-4-methyl-aniline are refluxed in 1 l of methanol and 5 ml of concentrated hydrochloric acid for 2 hours. After cooling, the product is filtered off with suction and recrystallised from toluene. 230 g (59% of theory) of beige crystals of melting point 190°–192° C. and of the formula

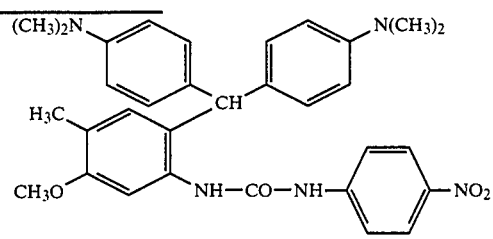

are obtained 16.6 of these crystals are oxidised analogously to Example 1 or 13. 14.3 g (86% of theory) of yellow crystals of melting point 265°–267° C. (decomposition) and of the formula

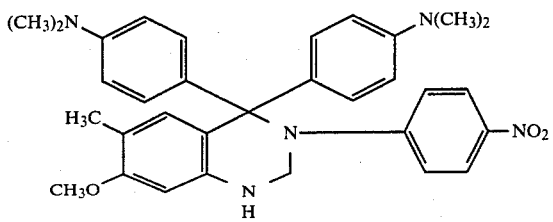

are thus obtained.

A solution in glacial acetic acid becomes blue-green with $\lambda_{max}=486, 620$ nm. A blue-green colour is likewise developed on acid clay.

The following 4,4-diaryldihydroquinazolones can be prepared analogously:

EXAMPLE 45

36.4 g of the compound prepared analogously to German Patent Specification No. 82,634, of the formula

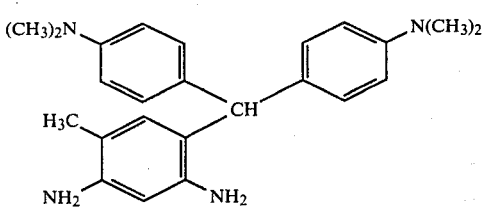

are stirred in 250 ml of toluene with 41 g of 4-nitrophenyl isocyanate at 70° C. for 2 hours. After cooling, the product is filtered off with suction, washed with toluene and methanol and dried. 65 g (94% of theory) of a yellow powder of melting point 200°–202° C. (decomosition) and of the formula

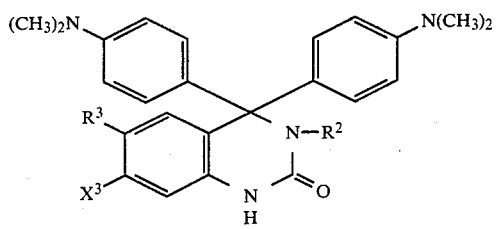

| Example | R² | R³ | X³ | Colour shade on clay with bisphenol A |
|---|---|---|---|---|
| 41 | ◯-NO₂ (ortho) | —C₂H₅ | CH₃O— | green |
| 42 | ◯(NO₂)(NO₂) | —CH₃ | C₂H₅O— | green |
| 43 | pyridyl | —CH₂—◯ | CH₃O— | green |
| 44 | ◯—SO₂CH₃ | —CH₃ | CH₃O— | green |

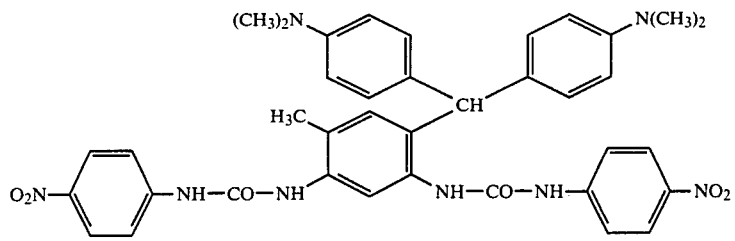

are obtained.

20.8 g of this compound are oxidised analogously to Example 1 or 13. The crude product is boiled in 100 ml of ethanol until decolorisation occurs. After cooling, 18.7 g (90% of theory) of a yellowish crystalline powder of melting point 265°–267° C. (decomposition) and of the formula

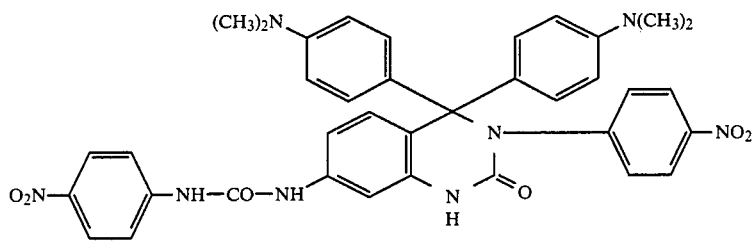

are obtained.

A solution in glacial acetic acid becomes green with $\lambda_{max}=470, 622$ nm. A dull green colour is likewise developed with bisphenol A.

The following 4,4-diaryldihydroquinazolones are prepared analogously:

| Example | $X^1=X^2$ | $R^2$ | $R^3$ | Colour on clay or with bisphenol A |
|---|---|---|---|---|
| 46 | —$N(C_2H_5)_2$ | 4-pyridyl | $C_2H_5$ | green |
| 47 | —N(C₂H₅)(C₂H₄CN) | 2,5-dichloro-4-cyanophenyl | $CH_3$ | " |

EXAMPLE 48

8.04 g of Michler's ketone and 7.06 g of the urea of the formula

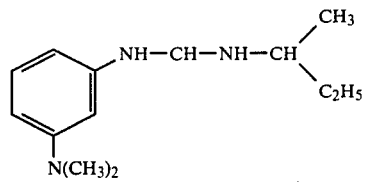

are stirred in 60 ml of phosphorus oxychloride at 30° C. for 2 hours. The mixture is then discharged onto 1 l of water and the pH is brought to 10 with sodium hydroxide solution. The precipitate is filtered off with suction and boiled several times in 10 ml of ethanol for 1 hour. Finally, 3.3 g (23% of theory) of a light grey powder of melting point 311°–312° C. (decomposition), which is identical to that obtained in Example 1, are obtained.

EXAMPLE 49

Preparation of a pressure-sensitive copying paper

A solution of 3 g of the 4,4-diaryldihydroquinazolone compound of Example 13 in 80 g of diisopropylnaphthalene and 17 g of kerosene is microencapsulated by coacervation in a manner which is known per se using gelatine and gum arabic, the microcapsules are mixed with starch solution and the mixture is coated onto a sheet of paper. A second sheet of paper is coated on the front side with acid-activated bentonite, as a colour developer. The first sheet and the sheet coated with the colour developer are placed one on top of the other, with the coatings adjacent. Pressure is exerted by writing manually or with a typewriter on the first sheet, and an intensive blue copy which is excellently fast to light develops on the sheet coated with the developer.

EXAMPLE 50

1 g of the 4,4-diaryldihydroquinazolone compound of Example 12 is dissolved in 17 g of toluene. 12 g of polyvinyl acetate, 8 g of calcium carbonate and 2 g of titanium dioxide are added to this solution, with stirring. The resulting suspension is diluted with toluene in a weight ratio of 1/1 and is coated onto a sheet of paper with a 10 μm doctor blade. A second sheet of paper is placed over this sheet of paper, the reverse side of the second sheet of paper being coated, in an application amount of 3 g/m², with a mixture consisting of 1 part of an amide wax, 1 part of a stearin wax and 1 part of zinc chloride. Pressure is exerted by writing manually or with a typewriter on the upper sheet, and an intensive blue colour which is fast to light develops on the sheet coated with the colour-forming agent.

EXAMPLE 51

Preparation of a heat-sensitive recording material 32 g of 4,4'-isopropylidene-diphenol (bisphenol A), 3.8 g of the distearylamide of ethylenediamine, 89 g of kaolin, 20 g of a polyvinyl alcohol hydrolysed to the extent of 88% and 55 ml of water are ground in a ball mill until the particle size is about 5 μm. 6 g of the 4,4-diaryldihydroquinazolone compound of Example 9, 3 g of a polyvinyl alcohol hydrolysed to the extent of 88% and 60 ml of water are ground in a second ball mill to a particle size of about 3 μm. The two dispersions are brought together and coated onto paper with a dry application weight of 5.5 g/m². When the paper is touched with a heated ballpoint pen, an intensive blue colour is obtained, which has good fastness to light and sublimation.

EXAMPLE 52

2.7 g of the 4,4-diaryldihydroquinazolone compound of Example 18, 24 g of N-phenyl-N'-(1-hydroxy-2,2,2-trichloro-ethyl)-urea, 16 g of stearic acid amide, 59 g of a polyvinyl alcohol hydrolysed to the extent of 88% and 58 ml of water are ground in a ball mill until the particle size is 2–5 μm. This suspension is coated onto a sheet of paper with a dry application weight of 5.5 g/m². By touching the paper with a heated ballpoint pen, an intensive blue colour which is fast to light is obtained.

We claim:
1. Chromogenic 4,4-diaryldihydroquinazolones of the formula

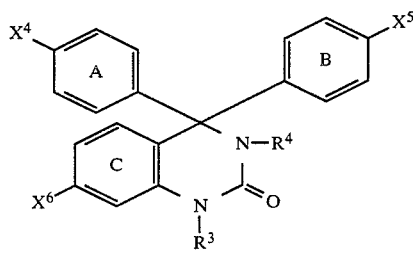

wherein
one of the radicals $X^4$, $X^5$ or $X^6$ represents $NY^4Y^5$ and the others independently of one another denote hydrogen; halogen; $C_1$- to $C_{12}$-alkyl; phenyl which is optionally substituted by chlorine and/or $C_1$- to $C_{12}$-alkyl; $C_1$- to $C_{12}$-alkanoylamino; benzoylamino which is optionally substituted by chlorine and/or $C_1$- to $C_{12}$-alkyl; $NY^4Y^5$, $OY^6$ or $SY^6$;
$R^3$ denotes hydrogen; $C_1$- to $C_{12}$-alkyl; cyclohexyl; benzyl or phenyl radicals, each of which is optionally substituted by chlorine and/or $C_1$-$C_4$-alkyl;
$R^4$ denotes hydrogen; $C_1$- to $C_{30}$-alkyl, which optionally carries chlorine, cyano, $C_1$- to $C_4$-alkoxycarbonyl and/or $C_1$- to $C_4$-alkoxy; cyclohexyl, which optionally carries chlorine and/or $C_1$- to $C_4$-alkyl; benzyl, which optionally carries nitro, chlorine, $C_1$- to $C_4$-alkyl and/or $C_1$- to $C_4$-alkoxy; phenyl, naphthyl, picolyl, pyridyl, pyrimidyl, pyrazinyl, triazinyl, triazolyl, thiadiazolyl, tetrazolyl, optionally benzo-fused imidazole, oxazole or thiazole radicals, each of which optionally carries chlorine, bromine, nitro, $C_1$- to $C_4$-alkyl, $C_1$- to $C_4$-alkoxy, $C_1$- to $C_4$-alkylthio, mono- or di-$C_1$- to $C_4$-dialkylamino, $C_1$- to $C_4$-alkylsulphonyl, cyano and/or $C_1$- to $C_4$-alkoxycarbonyl;
$Y^4$, $Y^5$ and $Y^6$ independently of one another denote $C_1$- to $C_8$-alkyl, which is optionally substituted by chlorine, cyano, $C_1$- to $C_4$-alkoxycarbonyl or $C_1$- to $C_4$-alkoxy; cyclohexyl or phenyl or benzyl, each of which is optionally substituted by chlorine, $C_1$- to $C_4$-alkyl or $C_1$- to $C_4$-alkoxy, or members which are necessary to complete together with ring A, B and C respectively to which they are attached one of the ring systems of the following formulae

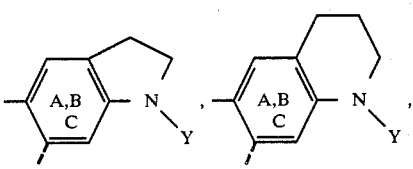

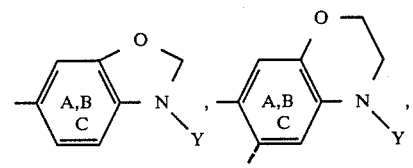

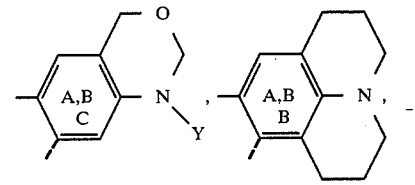

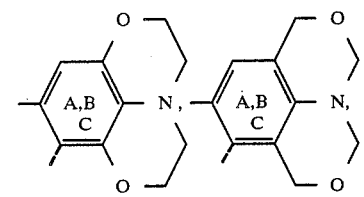

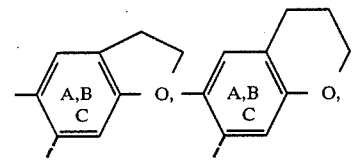

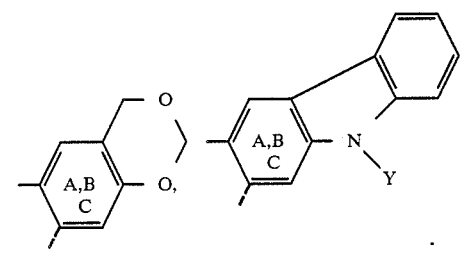

wherein in the case of ring C the free bond and the broken line denote the points fused to the dihydropyrimidone ring, Y represents hydrogen; $C_1$- to $C_8$-alkyl which is optionally substituted by chlorine, cyano, $C_1$- to $C_4$-alkoxycarbonyl or $C_1$- to $C_4$-alkoxy; cyclohexyl or phenyl or benzyl, each of which is optionally substituted by chlorine, $C_1$- to $C_4$-alkyl or $C_1$- to $C_4$-alkoxy;

the saturated ring part of the above ring systems being optionally substituted by up to 4 radicals from the group consisting of chlorine, $C_1$- to $C_4$-alkyl, $C_1$- to $C_4$-alkoxy and phenyl and the rings A, B and C are optionally substituted by chlorine, $C_1$- to $C_4$-alkyl, $C_1$- to $C_4$-alkoxy and/or $C_1$- to $C_4$-alkanoylamino; or $NY^4Y^5$ denotes a pyrrolo, pyrrolidino, piperidino, pipecolino, morpholino, pyrazolo or pyrazolino radical, each of which is optionally substituted by chlorine, $C_1$- to $C_4$-alkyl or phenyl.

2. Chromogenic 4,4-diaryldihydroquinazolones of the formula of claim 1, wherein two of the radicals $X^4$, $X^5$ or $X^6$ represent $NY^4Y^5$ and the others represent hydrogen; chlorine; bromine; $C_1$–$C_4$-alkyl; phenyl, which is optionally substituted by chlorine and/or $C_1$- to $C_4$-alkyl; phenyl, which is optionally substituted by chlorine and/or $C_1$- to $C_4$-alkyl; $C_1$- to $C_4$-alkanoylamino; benzoylamino, which is optionally substituted by chlorine and/or $C_1$- to $C_4$-alkyl; $OY^6$ or $SY^6$;

$R^3$ represents hydrogen or $C_1$–$C_4$-alkyl, $R^4$ represents hydrogen; $C_1$- to $C_{12}$-alkyl, which optionally carries chlorine or $C_1$- to $C_4$-alkoxy; cyclohexyl; benzyl, which optionally carries chlorine and/or $C_1$- to $C_4$-alkyl; or phenyl, naphthyl, picolyl, pyridyl, pyrimidyl, pyrazinyl, triazinyl, triazolyl, thiadiazolyl, tetrazolyl, optionally benzo-fused imidazole, oxazole or thiazole radicals, each of which optionally carries chlorine, bromine, nitro, $C_1$- to $C_4$-alkyl, $C_1$- to $C_4$-alkoxy, $C_1$- to $C_4$-alkylthio, $C_1$- to $C_4$-dialkylamino, $C_1$- to $C_4$-alkylsulphonyl, cyano and/or $C_1$- to $C_4$-alkoxycarbonyl, $Y^4$, $Y^5$ and $Y^6$ independently of one another represent hydrogen; $C_1$–$C_4$-alkyl, which is optionally substituted by chlorine, methyl or methoxy; or members which are necessary to complete together with ring A, B and C respectively to which they are attached one of the ring systems of the following formulae

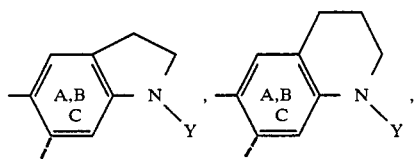

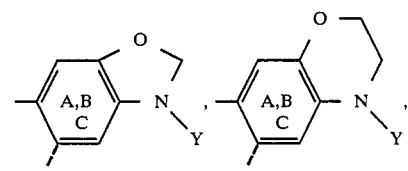

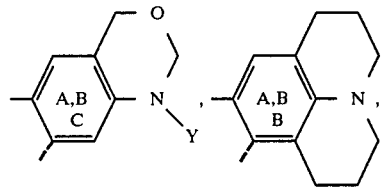

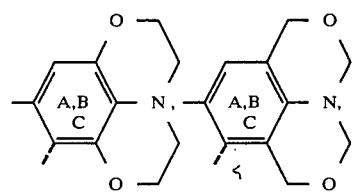

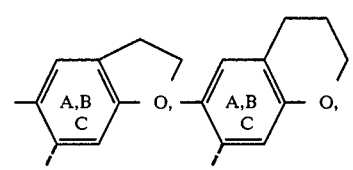

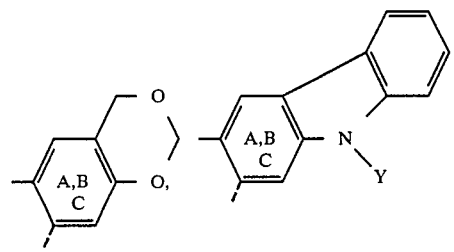

wherein in the case of ring C the free bond and the broken line denote the points fused to the dihydropyrimidone ring.

3. Chromogenic 4,4-diaryl-dihydroquinazolones according to claim 1, of the formula

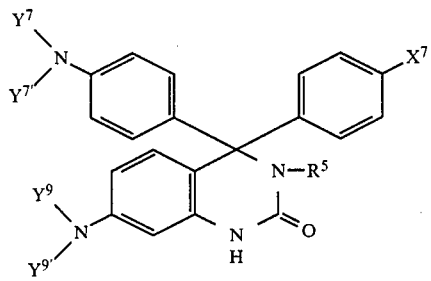

wherein
$R^5$ denotes methyl, ethyl, 1-propyl, 2-propyl, 2-methyl-1-propyl, 1-butyl, 2-butyl, 2,2-dimethyl-1-propyl, 1-pentyl, 2-pentyl, 1-hexyl, 1-dodecyl, 1-tetradecyl, 1-hexadecyl, 1-octadecyl, 2-bornylmethyl, cyclohexyl, benzyl, phenyl, 2-, 3- or 4-tolyl, 2-, 3- or 4-anisyl, 2-, 3- or 4-chlorophenyl, 2-, 3- or 4-nitro-phenyl, 2-, 3- or 4-cyano-phenyl, 2-, 3- or 4-trifluoromethyl-phenyl, 3- or 4-methoxycarbonyl-phenyl, 3- or 4-methoxysulphonyl-phenyl, 2,4-dinitro-phenyl, 3-chloro-4-trifluoromethyl-phenyl, 2-chloro-4-nitrophenyl, 3-chloro-4-nitro-phenyl, 5-chloro-2-methyl-4-nitro-phenyl, 4-chloro-3-methyl-phenyl, 3,4-dicyano-phenyl, 2,5-dichloro-4- cyanophenyl, 4-pyridyl, benzothiazolyl, 5-methylbenzoxazolyl or 4,5,6-trichloro-2-pyrimidyl, $X^7$ denotes $NY^8Y^{8'}$ or hydrogen, methoxy, ethoxy, propoxy, benzyloxy, methylthio or ethylthio, $Y^7$ to $Y^9$ denote methyl, ethyl, cyanoethyl, methoxyethyl, methoxycarbonylethyl, benzyl or phenyl and $Y^{7'}$ to $Y^{9'}$ denote hydrogen, methyl, ethyl, cyanoethyl, methoxyethyl, methoxycarbonylethyl, benzyl or phenyl.

4. Chromogenic 4,4-diaryl-dihydroquinazolones according to claim 1, of the formula

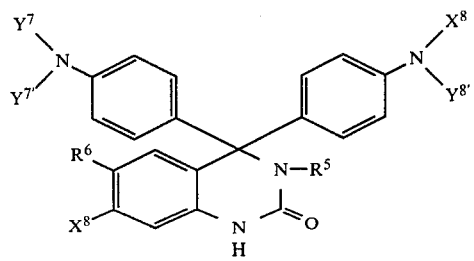

wherein
$R^6$ denotes hydrogen, chlorine, methyl or methoxy,
$X^8$ denotes hydrogen, chlorine, methyl, ethyl, propyl, butyl, benzyl, methoxy, ethoxy, propoxy, benzyloxy, methylthio, ethylthio, acetylamino, benzoylamino or $NHCONHR^5$, and wherein
$R^6$ and $X^8$ do not simultaneously represent hydrogen, and
$R^5$, $Y^7$, $Y^{7'}$, $Y^8$, and $Y^{8'}$ have the meaning given in claim 3.

* * * * *

UNITED STATES PATENT AND TRADEMARK OFFICE
CERTIFICATE OF CORRECTION

PATENT NO. : 4,695,633
DATED      : Sept, 22, 1987
INVENTOR(S): Berneth et al.

It is certified that error appears in the above-identified patent and that said Letters Patent is hereby corrected as shown below:

Col. 17, Example 27    Delete "$C_6H_5$" and substitute --$C_2H_5$--
Col. 21, line 32       Delete lower portion of formula and substitute

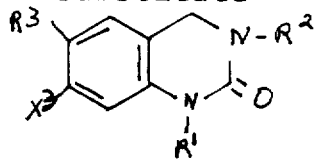

Col. 23, line 1        Delete lower portion of formula and substitute

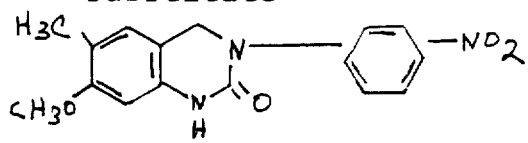

Signed and Sealed this

Third Day of May, 1988

Attest:

DONALD J. QUIGG

Attesting Officer

Commissioner of Patents and Trademarks